United States Patent [19]
VanderLans

[11] Patent Number: 5,785,090
[45] Date of Patent: Jul. 28, 1998

[54] PIPELINE STOPPER PLUG AND METHOD THEREFORE

[76] Inventor: Gerald J. VanderLans, P.O. Box 758, Lodi, Calif. 95240

[21] Appl. No.: 369,753

[22] Filed: Jan. 6, 1995

Related U.S. Application Data

[62] Division of Ser. No. 665,585, Mar. 6, 1991, Pat. No. 5,379,802.

[51] Int. Cl.[6] .................................................. F16L 55/12
[52] U.S. Cl. .................................... 138/89; 138/93
[58] Field of Search ............................ 138/89, 90, 91, 138/93, 97

[56] References Cited

U.S. PATENT DOCUMENTS

| | | | |
|---|---|---|---|
| D. 300,350 | 3/1989 | Mathison | D23/260 |
| 539,568 | 5/1895 | Bride . | |
| 628,726 | 7/1899 | Schultz | 138/93 |
| 1,048,208 | 12/1912 | Raflovich . | |
| 1,240,433 | 9/1917 | Foote . | |
| 1,549,962 | 8/1925 | Burdette . | |
| 1,760,750 | 5/1930 | Goodman . | |
| 1,795,848 | 3/1931 | Drees | 138/93 |
| 1,842,652 | 1/1932 | Biggs . | |
| 1,906,151 | 4/1933 | Goodman | 138/93 |
| 2,299,116 | 10/1942 | Svirsky | 138/90 |
| 2,476,817 | 7/1949 | Charnes | 18/45 |
| 2,559,064 | 7/1951 | Cunningham | 150/8 |
| 2,612,924 | 10/1952 | Cunningham | 150/1 |
| 2,613,169 | 10/1952 | Cunningham | 154/83 |
| 2,623,571 | 12/1952 | Webber | 154/14 |
| 2,672,902 | 3/1954 | Prager et al. | 150/5 |
| 2,678,666 | 5/1954 | Theis et al. | 138/93 |
| 2,927,609 | 3/1960 | Vanderlans | 138/93 |
| 3,103,235 | 9/1963 | Stringham, III | 138/97 |
| 3,168,909 | 2/1965 | Zurbrigen et al. | 138/97 |
| 3,269,421 | 8/1966 | Telford et al. | 138/97 |
| 3,459,230 | 8/1969 | Smith | 138/97 |
| 3,618,639 | 11/1971 | Daley et al. | 138/97 |
| 3,750,711 | 8/1973 | Conklin et al. | 138/97 |
| 3,763,896 | 10/1973 | Horne et al. | 138/89 |
| 3,834,422 | 9/1974 | Larson | 138/97 |
| 3,874,926 | 4/1975 | Horne et al. | 134/24 |
| 3,897,088 | 7/1975 | Beinbaur | 285/97 |
| 3,951,173 | 4/1976 | Larson | 138/97 |
| 4,025,360 | 5/1977 | Horne et al. | 134/24 |
| 4,070,904 | 1/1978 | Vanderlans | 73/40.5 |
| 4,079,755 | 3/1978 | Vanderlans | 138/93 |
| 4,096,997 | 6/1978 | Larson | 239/413 |
| 4,182,642 | 1/1980 | Vanderlans | 156/121 |
| 4,274,206 | 6/1981 | Moolenaar | 33/178 |
| 4,377,184 | 3/1983 | Vetter | 138/89 |
| 4,421,698 | 12/1983 | Vanderlans | 264/40.1 |
| 4,446,983 | 5/1984 | Gerber | 220/219 |
| 4,467,835 | 8/1984 | Champleboux | 138/93 |
| 4,467,836 | 8/1984 | Ragout | 138/98 |
| 4,493,344 | 1/1985 | Mathison et al. | 138/89 |

(List continued on next page.)

FOREIGN PATENT DOCUMENTS

| | | | |
|---|---|---|---|
| 0854297 | 8/1952 | Germany | 138/93 |
| 0020301 | 5/1907 | United Kingdom | 138/93 |
| 188695 | 11/1922 | United Kingdom . | |

OTHER PUBLICATIONS

Mechanics of Pneumatic Tires; U.S. National Bureau of Standards; Joseph D. Walter; Issued: Nov. 1971; pp. 405–421.

*Primary Examiner*—Denise L. Ferensic
*Assistant Examiner*—James F. Hook
*Attorney, Agent, or Firm*—Bernhard Kreten

[57] ABSTRACT

A stopper plug and method for making the same. A reinforcement spider is integrally laminated within a multi-layered plug formed from several plies of elastomeric and unidirectional reinforcement. The spider cooperates with end plates such that expansion of the plug causes both longitudinal contraction of the plug and radial expansion while concomitantly increasing the force by which the end plates are attached to the plug preventing delamination at that juncture. Two forms of plug are shown. One has capped endwalls provided with nipple outlets and one is provided with a throughflow central passageway.

28 Claims, 7 Drawing Sheets

U.S. PATENT DOCUMENTS

| | | | |
|---|---|---|---|
| 4,612,961 | 9/1986 | Vetter | 138/93 |
| 4,614,206 | 9/1986 | Mathison et al. | 138/93 |
| 4,627,470 | 12/1986 | Carruthers | 138/93 |
| 4,691,728 | 9/1987 | Mathison | 137/15 |
| 4,721,397 | 1/1988 | Knutar | 383/70 |
| 4,763,511 | 8/1988 | Mathison et al. | 73/49.1 |
| 4,817,671 | 4/1989 | Mathison et al. | 138/89 |
| 4,883,094 | 11/1989 | Vetter | 138/89 |

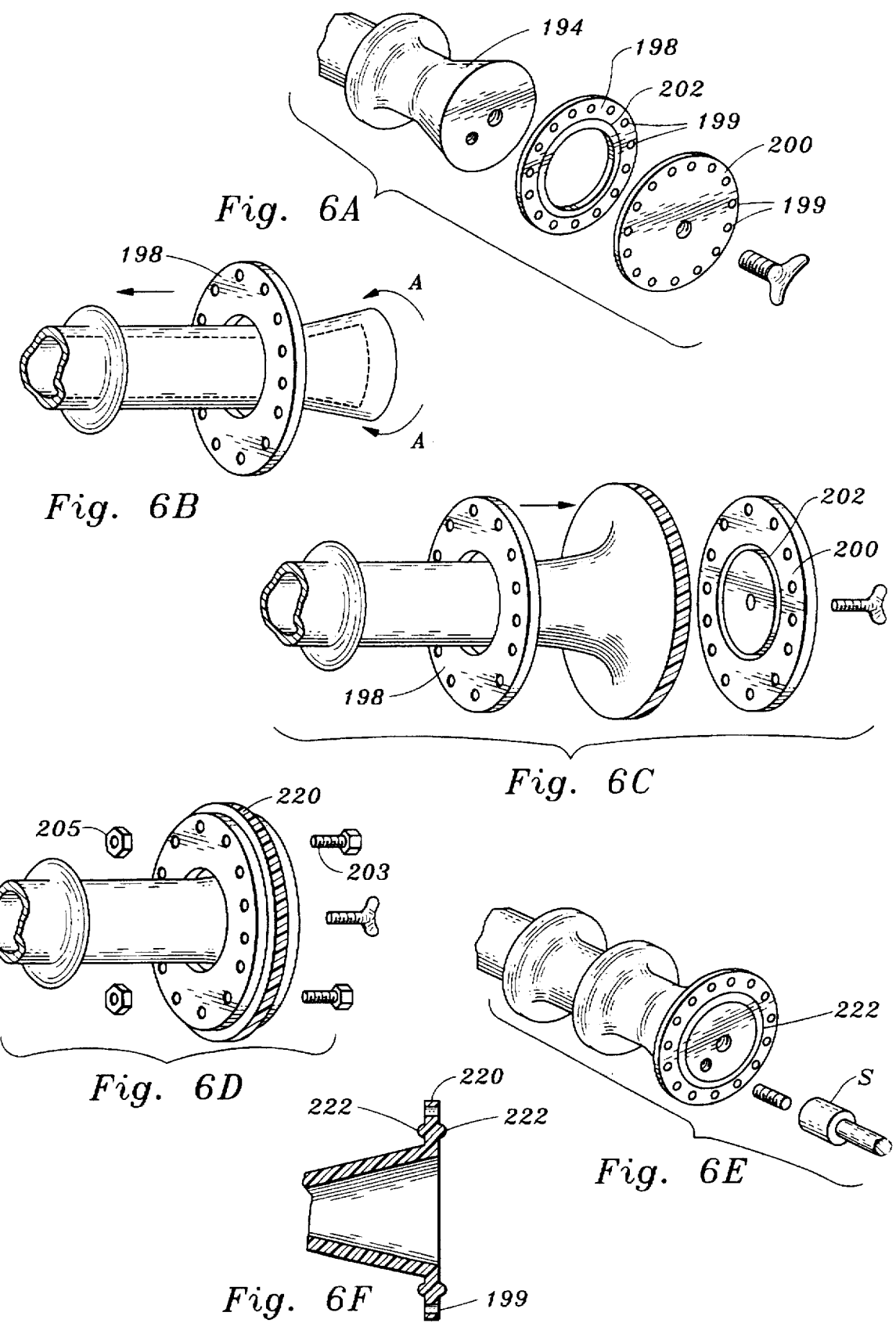

5,785,090

PIPELINE STOPPER PLUG AND METHOD THEREFORE

This application is a division of application Ser. No. 07/665,585, filed, Mar. 6, 1991 now U.S. Pat. No. 5,379,802.

FIELD OF THE INVENTION

The following invention relates generally to pipeline, commonly known as "stoppers" which are used extensively in pipes, tubes, conduits, etc. for sealing against (or diverting) the flow of: gases, liquids, slurries, and other materials.

BACKGROUND OF THE INVENTION

Frequently, in the installation, testing and maintenance of pipelines it becomes necessary to interrupt the flow of the material contained within the pipeline or to seal off areas of the pipeline and divert the flow. Plugs which are inflatable are widely used and have proven extremely reliable in service. It is extremely likely that workmen will have to be protected only by the effectiveness of the plug when working downstream from the fluid flow. Thus, it is essential that these plugs operate in their intended manner. Currently a wide variety of different types of plugs are on the market which generally perform satisfactorily.

The following patents reflect the state of the art of which applicant is aware and are included to discharge applicant's acknowledged duty to disclose known prior art. However, it is respectfully stipulated that none of these patents teach singly nor render obvious when considered in any conceivable combination the nexus of the instant invention as set forth hereinafter and as especially claimed.

| INVENTOR | PATENT NO. | ISSUE DATE |
| --- | --- | --- |
| Bride, C. T. | 539,568 | May 21, 1895 |
| Raflovich, G. H. | 1,048,208 | December 24, 1912 |
| Foote, F. J. | 1,240,433 | September 18, 1917 |
| Burdette, R. S. | 1,549,962 | August 18, 1925 |
| Goodman, P. | 1,760,750 | May 27, 1930 |
| Biggs, N. W. | 1,842,652 | January 26, 1932 |
| Svirsky, B. | 2,299,116 | October 20, 1942 |
| Charnes, J. E. | 2,476,817 | July, 19, 1949 |
| Cunningham, M. M. | 2,559,064 | July 3, 1951 |
| Cunningham, M. M. | 2,612,924 | October 7, 1952 |
| Cunningham, M. M. | 2,613,169 | October 7, 1952 |
| Webber, E. G. | 2,623,571 | December 30, 1952 |
| Prager, W. | 2,672,902 | March 23, 1954 |
| Vanderlans, C. J. F. | 2,927,609 | March 8, 1960 |
| Stringham III, E. B. | 3,103,235 | September 10, 1963 |
| Zurbrigen, J. A. et al. | 3,168,909 | February 9, 1965 |
| Telford, E. B. et al. | 3,269,421 | August 30, 1966 |
| Daley, D. R. et al. | 3,618,639 | November 9, 1971 |
| Conklin et al. | 3,750,711 | August 7, 1973 |
| Horne et al. | 3,763,896 | October 9, 1973 |
| Larson | 3,834,422 | September 10, 1974 |
| Horne et al. | 3,874,926 | April 1, 1975 |
| Beinhaur | 3,897,088 | July 29, 1975 |
| Larson | 3,951,173 | April 20, 1976 |
| Horne et al. | 4,025,360 | May 24, 1977 |
| Vanderlans | 4,070,904 | January 31, 1978 |
| Vanderlans | 4,079,755 | March 21, 1978 |
| Larson | 4,096,997 | June 27, 1978 |
| Vanderlans | 4,182,642 | January 8, 1980 |
| Moolenaar | 4,274,206 | June 23, 1981 |
| Vetter | 4,377,184 | March 22, 1983 |
| Vanderlans | 4,421,698 | December 20, 1983 |
| Gerber | 4,446,983 | May 8, 1984 |
| Champleboux | 4,467,835 | August 28, 1984 |
| Ragout | 4,467,836 | August 28, 1984 |
| Mathison et al. | 4,493,344 | January 15, 1985 |
| Vetter | 4,612,961 | September 23, 1986 |
| Mathison et al. | 4,614,206 | September 30, 1986 |
| Carruthers | 4,627,470 | December 9, 1986 |
| Mathison | 4,691,728 | September 8, 1987 |
| Knutar | 4,721,397 | January 26, 1988 |
| Mathison et al. | 4,763,511 | August 16, 1988 |
| Mathison | Des. 300,350 | March 21, 1989 |
| Mathison et al. | 4,817,671 | April 4, 1989 |
| Vetter | 4,883,094 | November 28, 1989 |

Mechanics of Pneumatic Tires; U.S. National Bureau of Standards; Joseph D. Walter; Issued: November 1971; pp 405–421.

So. Ca. P; General Catalogue; Date of Issue and author unknown.

Uniroyal Brochure "Uniroyal Pipe Stoppers"; Uniroyal, Inc., Engineered Systems Depts.; Date of Issue unkown.

The patent granted to applicant, U.S. Pat. No. 4,079,755, teaches the use of an inflatable plug provided with unidirectional fibers skewed with respect to the long axis of the plug which controls the expansion of the plug upon inflation. While this device is extremely durable in construction and safe to use, the instant application is directed to ongoing evolutionary improvements when contrasted with this known prior art. One area of improvement involves the reinforcement that is provided in the instant invention at the terminal extremities of a plug.

The patent to Goodman U.S. Pat. No. 1,760,750, teaches the use of a stopper for gas and water mains in which longitudinal strengthening tapes coact with reinforcing tapes at one end of a plug to reliably support means at one end of the plug for drawing the stopper into position in the main. The instant invention is distinguished over the Goodman patent in many ways both structurally and functionally, with the net result being improved performance in all aspects.

The remaining citations show the state of the art further and diverge more starkly from the instant invention. More particularly, these plugs are prone to failure where the plug body co-joins with end plate components which traditionally serve as hosts for valves, pull-rings and the like. Most plugs are pneumatically expanded to seal off the conduit. Reaction forces exist between end plates and the plug body and exhibit a tendency to fail at that point since rigid end plates do not expand and the body portion must. Thus, in use, there is a tendency of the plug body to try and peal away from the end plates. Reinforcing this area has been the focus of many lay-up techniques.

Because the nature of the plug seal within the conduit involves pressure between the body member of the plug and an interior wall of the conduit, failure of the plug, for example by fatigue or inadvertent over inflation can cause injury to personnel near the plug.

SUMMARY OF THE INVENTION

The instant invention is distinguished over the known prior art in a multiplicity of ways. In its most elemental form, the invention takes into account the forces that are generated during the inflation process of the plug and harnesses those forces to increase the structural integrity of the plug as the inflation process proceeds to its optimum design level. While the term "inflation" is used throughout the text, it should be understood that any sort of pressure which causes distension of the plug is intended as within the ambit of the instant invention.

As the internal pressure of the plug increases, according to one form of the invention the tendency of the plug is to simultaneously contract longitudinally and expand radially. The nature of this phenomenon is best understood when considering that the forces acting on the plug wall coact against unidirectional fibers which have been skewed from the long axis of the plug. Inflation causes these unidirectional fibers to shorten the plug longitudinally while the plug swells radially.

According to one form of the instant invention, two end plates are provided each having a core and an annular flange. Each flange buts up against opposite ends of a laminated plug. The flange is bonded to the laminate. A "spider" member, in turn, defines a reinforcing means. It includes a ring or annulus coupled to reinforcing straps which radiate outwardly from the ring. These straps are bonded into the laminated plug so that the following effects have been manifested.

The ring and the flange reside on terminal portions of the plug, and the straps emanating from the ring are integrally formed with the plug. Thus, longitudinal contraction of the plug upon inflation coupled with radial expansion of the plug finds cooperation between the reinforcing means and the plug and not a tendency to delaminate.

In general, one way of effecting this type of plug is to initially lay-up an elastomeric layer on a mandrel which has an interior provided with an air inlet and an air outlet. The elastomeric layer is configured to completely envelop the mandrel except for the air inlet area. Next, at least two unidirectional cord layers are built up on the mandrel in a preferred embodiment.

Preferably each unidirectional cord layer is skewed from the long axis of the plug. The pairs of unidirectional cord layers are off-set at substantially equal and opposite angles with respect to the longitudinal axis of the plug. This unidirectional cord lay-up technique causes the phenomena of radial expansion coupled with longitudinal compression upon inflation of the plug. The unidirectional cord lay-ups may completely envelop the mandrel except for the opening defining an inlet on the mandrel.

A reinforcing means defined substantially as a ring having a plurality of radially extending straps are placed on the mandrel next preferably at a site on the mandrel diametrically opposed from the air inlet. The reinforcing straps are adhered onto the unidirectional cord layer and a final coat of elastomeric is provided on the plug while maintaining the air inlet opening.

After vulcanization of this laminate, the plug is ejected from the mandrel by admitting air into the mandrel. The air exits the mandrel at an outlet that has been covered by the plug. This causes inflation of the plug and expands the plug over the mandrel for easy removal. This basic plug serves as a platform upon which various different plugs can be fabricated responsive to specialized needs in the stopper industry.

OBJECT OF THE INVENTION

Accordingly, it is a primary object of the present invention to provide a novel and useful stopper plug.

A further object of the present invention is to provide a device as characterized above which is extremely durable in construction, safe to use and lends itself to mass production techniques.

Another object of the present invention is to provide a device as characterized above where the prior art tendency of the plug to delaminate at the juncture between an expansible and non-expansible portion does not exist.

Another, further object of the present invention is to provide a device as characterized above which increases the structural integrity of the plug by having a reinforcing means integrally formed on the plug which cooperates with the expansion force characteristics of the plug under inflation rather than opposes them.

Viewed from a first vantage point, it is an object of the present invention to provide a plug for obturating a conduit. The conduit has an interior bore. The plug has a sleeve having an exterior dimension smaller than the bore of the conduit to be received within the bore. The sleeve has first and second ends and a first end wall closes the first end and a second end wall closes the second end. Reinforcing means are integrally formed on at least one end. The reinforcing means includes strap means emanating from a ring or annulus and extending into the sleeve. The strap means are integrally formed in both one end wall and the sleeve whereby the reinforcing means enhances the integrity of the plug.

Viewed from a second vantage point, it is an object of the present invention to provide a method for forming an expansible plug. A mandrel is formed as an enclosed volume including an interior is which provided with both a pneumatic inlet and outlet. A first ply of elastomeric material is disposed on the mandrel, while still providing an opening in the, ply around the pneumatic inlet. Two unidirectional plies of material are disposed on the first ply and are oriented such that each unidirectional ply is skewed with respect to a long axis of the mandrel. Both unidirectional plies are offset from the long axis by a substantially equal and opposite angle. An opening is provided in the unidirectional plies around the pneumatic inlet, and a reinforcing means is fabricated such that a plurality of straps radiate outwardly from a central web, and the web of the reinforcing means is oriented on an area of the unidirectional plies remote from the pneumatic inlet, with the straps juxtaposed against a portion of the unidirectional plies. A second ply of elastomeric material is disposed on the reinforcing means and unidirectional plies, while also providing an opening in the second ply of elastomeric material around the pneumatic inlet, and the thus formed plug is vulcanized.

These and other objects will be made manifest when considering the following detailed specification when taken in conjunction with the appended drawing figures.

DESCRIPTION OF THE DRAWING FIGURES

FIGS. 6A through 6E are perspective views of some fabricating details with respect to FIGS. 3, 4 and 5; FIG. 6F is a section of the part fabricated thereby.

DESCRIPTION OF PREFERRED EMBODIMENTS

Figures 1, 1A:
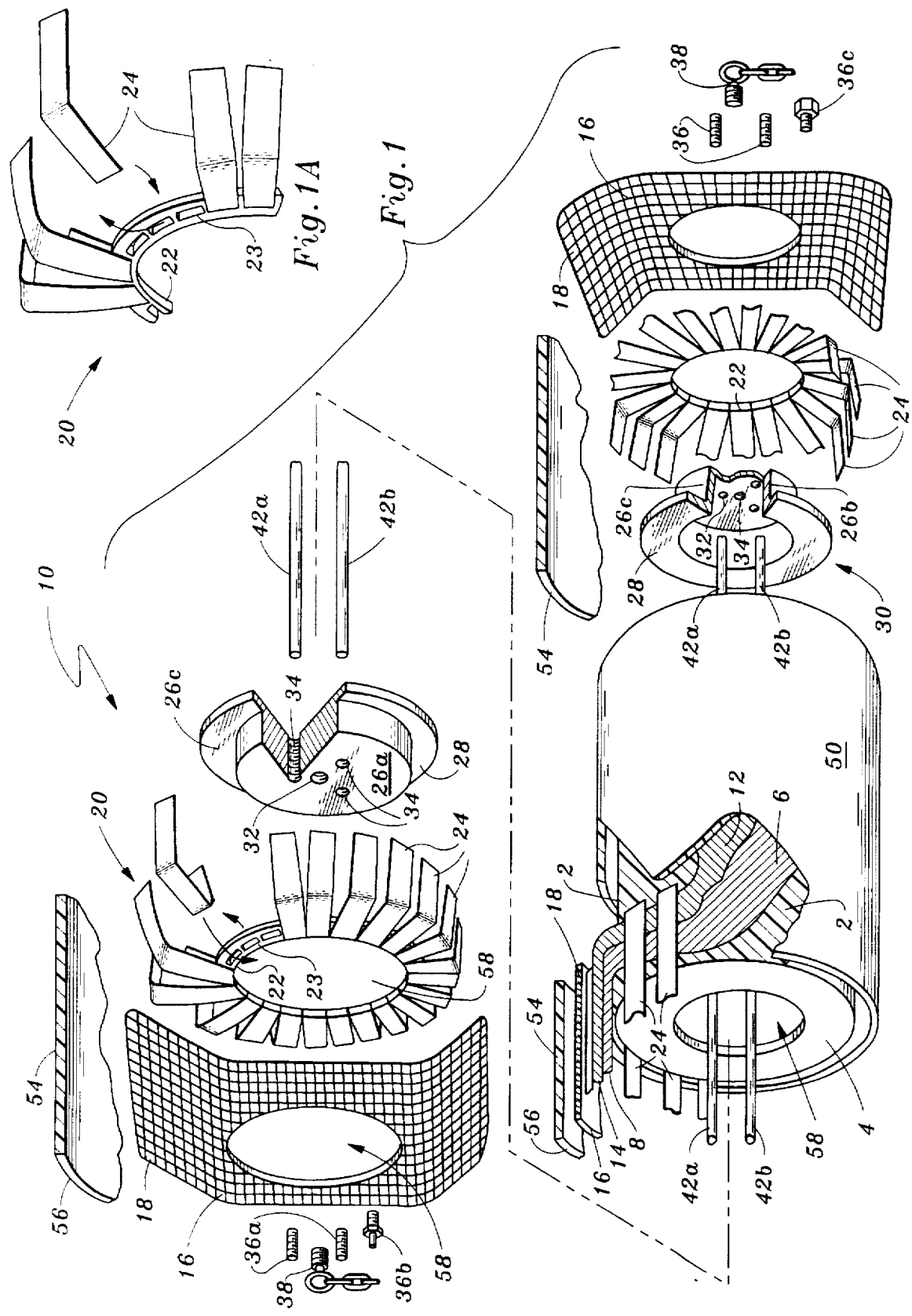
FIG. 1 is an exploded parts view in perspective, partially in section and showing the components of the instant invention.
FIG. 1A is a detail of an alternative embodiment of a portion of that which is shown in FIG. 1.

Referring to the drawings now, wherein like reference numerals refer to like parts throughout the various drawing figures, reference numeral 10 is directed to the stopper plug according to one form of the invention (FIGS. 1 and 2A, 2B) and reference numeral 100 is directed to a second embodiment shown in FIGS. 3–7.

Figure 2A:
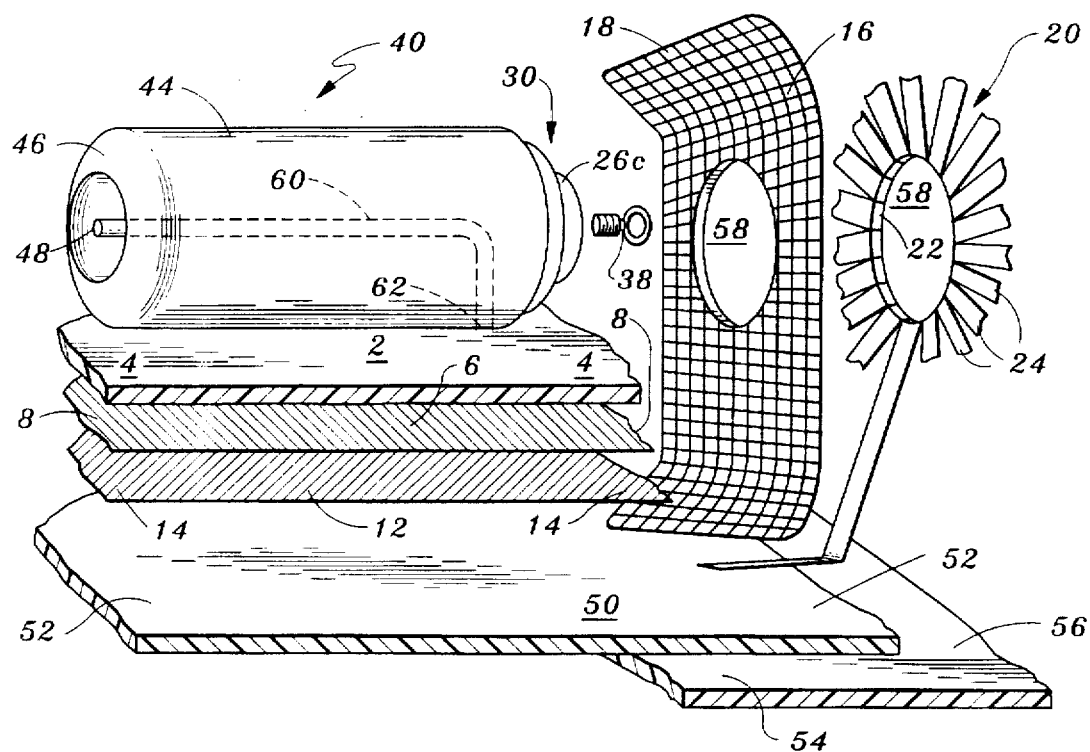
FIG. 2A shows one fabrication methodology associated with the FIG. 1 embodiment.

In its essence, the invention of FIGS. 1 and 2A, B reflect a stopper plug 10 and step by step methodology for fabrication. The stopper plug 10 is preferably formed on a mandrel 40 (FIG. 2A) and the fabricated plug 10 includes a multiplicity of plies of material, some elastomeric and some unidirectional fiber. "Spiders" 20 are formed at distal extremities of the plug 10 and cooperate with end plates 30 to enhance the structural integrity of the plug 10 after vulcanization. The spiders 20 alter the natural tendency of the plies of the plug 10 to separate at the juncture of the end plates 30 which heretofore had sometimes been experienced when the plug 10 was inflated. A final outer sheath 50 circumscribes the plug 10.

More particularly, the stopper plug 10 of the present invention can be formed in a multiplicity of ways, one example of which is delineated infra. However, as will be developed, because ultimate vulcanization of the multiple plies results in an integrated, uniform product, the sequencing of the plies, i.e. the order of plies, being built up on the mandrel 40 can vary. The mandrel 40 is preferably configured as an elongate mass having a middle section formed as a cylinder 44 that is provided with end walls 46 at distal extremities of the cylinder 44. Both end walls 46 are provided with threaded bores 48. The bore 48 shown in FIG. 2A can communicate with an internal passageway 60 to an outlet 62 located at the juncture between the remote end wall 46 and the cylinder 44. Note that the transition between the end walls 46 and the cylinder 44 of the mandrel 40 are radiused to reduce stress when building up the plug 10 by providing a smooth transition having minimal stress points because there are no sharp angles. Thus, the threaded bore 48, shown in FIG. 2A, defines an air inlet passageway with a means for letting the air provided within the mandrel 40 to escape at the air passage outlet 62. The mandrel 40 can either be hollow or have the passageway 60. Its purpose will become more evident in the ensuing description.

An end of the mandrel 40 opposite from that shown in FIG. 2A, has a threaded bore 48 which allows placement thereon of an end plate 30. The end plate 30 includes a peripheral flange 28 and a central disc-shaped core 26 shown in FIG. 1. A core 26a can be formed as a solid mass. A lower portion of FIG. 1 shows another variant of the core 26b having a hollow core. In any event, the right-hand-side end plate 30 is secured to an end of the mandrel 40 and fixed thereto by means of inserting a threaded pull ring 38 to contact the threaded bore 48 found on the right-hand-side of the mandrel 40.

With respect to the right-hand-side of FIG. 2A, the end plate 30 (FIG. 1) is initially coated with an elastomeric substance along the flange 28. Next, a first ply of elastomeric 2 is wrapped on the mandrel 40. The elastomeric 2 is taken from a class of materials including but not limited to rubber, neoprene, or any natural or synthetic substance having the properties of elasticity, i.e., the capability of being strained and distended and to recover its size and shape after deformation. Ends 4 of the first ply of elastomeric 2 are lapped over each of the end walls 46 of the mandrel 40. It is effective, however, to leave access to the bore 48 on the left-hand-side of the mandrel for coupling with a source of air (not shown). The other end 4 of the first ply of elastomeric 2 laps over the flange 28 and abuts against a peripheral wall 26c of the core 26.

Next, a first unidirectional ply 6 (having an end 8) is lapped on top of the first ply of elastomeric 2. A unidirectional ply is a series of parallel fibers formed from any material where the parallelism (when the ply is unstressed) is maintained by an elastomeric coating which holds the fibers. The first unidirectional ply in essence is formed from a class of materials which allows distension in a plane transverse to the direction that the fibers run, but may not permit elongation parallel to the long axis of the fibers. This first unidirectional ply 6 is oriented on top of the first ply of elastomeric 2 skewed at an angle from the long axis of the mandrel 40. While the angle of skewing is variable, and can range from a fraction of a degree to what would in effect be a 180° reversal, the preferred operating range of orientation for the unidirectional fiber is between ½° and 22½°.

It is to be noted that unidirectional plies are commercially available which are integrally formed with an outer elastomeric surface. In such event, it may be equally feasible to lay up a unidirectional ply directly on the cylinder 44 of the mandrel 40 without an underlying first ply of elastomeric 2. Note that the unidirectional ply 6 includes ends which are turned "down" on the end walls 46 of the mandrel as was described with respect to the first ply of elastomeric, providing clearance for the threaded bore 48 on the left-hand-side and while butting up to the peripheral wall 26c of the core 26.

A second unidirectional ply 12 is then placed on top of the first unidirectional ply 6. The orientation of the second unidirectional ply 12 is also skewed to address the mandrel 40 at the same angle as the skew of the first ply 6 but in an opposite direction. Thus, collectively, these two plies 6, 12 diverge from the long axis an equal extent. The collective angle between the two plies is twice the angle one ply is skewed from the long axis. As before, the second unidirectional ply 12 is provided with ends 14 that are turned down on the end walls 46 of the mandrel 40. As before, clearance at one end 14 of ply 12 is provided for the threaded bore 48 and the other end 14 of ply 12 buts against the periphery 26c of the core 26. Note that it is not essential that the first and second plies of unidirectional material be juxtaposed one against the other. In fact an elastomeric layer could be interposed between the plies 6, 12. That they merely oppose each other at approximately the same degree is desired to prevent plug twisting upon inflation.

The right-hand-side of FIG. 2A then is enveloped with a piece of scrim 16 having a marginal periphery 18 which laps over onto the cylinder 44 of the mandrel 40. The scrim 16 layer is optional; conversely multiple layers of the scrim 16 can be serially added or spaced one from another after the addition of the spider 20.

In essence, the spider 20 is formed with a Ring shaped like a rigid annulus (or flexible web) 22 from which radiates a plurality of straps 24 each of which are formed from an elastomeric material which may or may not have unidirectional threads contained therewithin. Preferably the annulus 22 is coated with elastomeric. It is preferred, however, that the straps 24 are provided with unidirectional threads running parallel to the length of the straps 24. Each strap 24 has a counterpart diametrically opposed from it so that forces generated by one strap 24 are opposed equally by another strap 24 opposite therefrom. This is especially desirable where the web 22 is formed from flexible material. However, where the annulus 22 is formed from rigid material, it is merely desirable that the loading on the annulus 22 be symmetrical, e.g., such as having straps 24 spaced 120° from one another.

The straps 24 can be adhered to the annulus 22 by either providing doubled over portions of strap 24 through opening 58 threading strap segments through slits 23 on the annulus, or using short sections of the unidirectional material (e.g. 12) which has been doubled over through opening 58. The outer unidirectional ply 12 could have its right end 14 pass through the annulus 22 and lap over to form the strap 24. The straps 24 preferably only extend a short distance (e.g. 6 inches) on the cylindrical part of plug 10. Either one of the unidirectional plies 6 or 12 can be threaded under the web/annulus 22 and serve as the straps 24 when doubled over. However, as should be evident, inflation of the plug formed with ply 12 (or 6) serving as strap 24 may cause a turning moment on the annulus 22 with respect to the long axis of the plug 10.

Note that the diameter of the annulus 22 is dimensioned to overlie the periphery 26C of the core 26. The collective combination of the web/annulus 22 and straps 24 which define the spider 20 when used in conjunction with the end plate 30 can now be better appreciated.

When a plug 10 is being inflated, the unidirectional plies 6, 12 encourage the plug to expand radially and contract longitudinally. End plates 30 that were heretofore merely lapped or tied into a plug 10 would experience shear forces at the juncture between the plug material and the metallic plate 30. When constructed with a spider 20 formed by the web/annulus 22 and straps 24 and the end plate 30, and by having the straps 24 at least partially over on the cylinder part of the plug 10, the tendency of the plug 10 to shear from the end plate 30 has been offset because the web 22 more strongly presses the end plate 30 into integral registry with the rest of the plug body. As the plug 10 contracts longitudinally, the straps 24 pull the end plate 30 inwardly while the plug 10 expands radially.

Figure 2B:
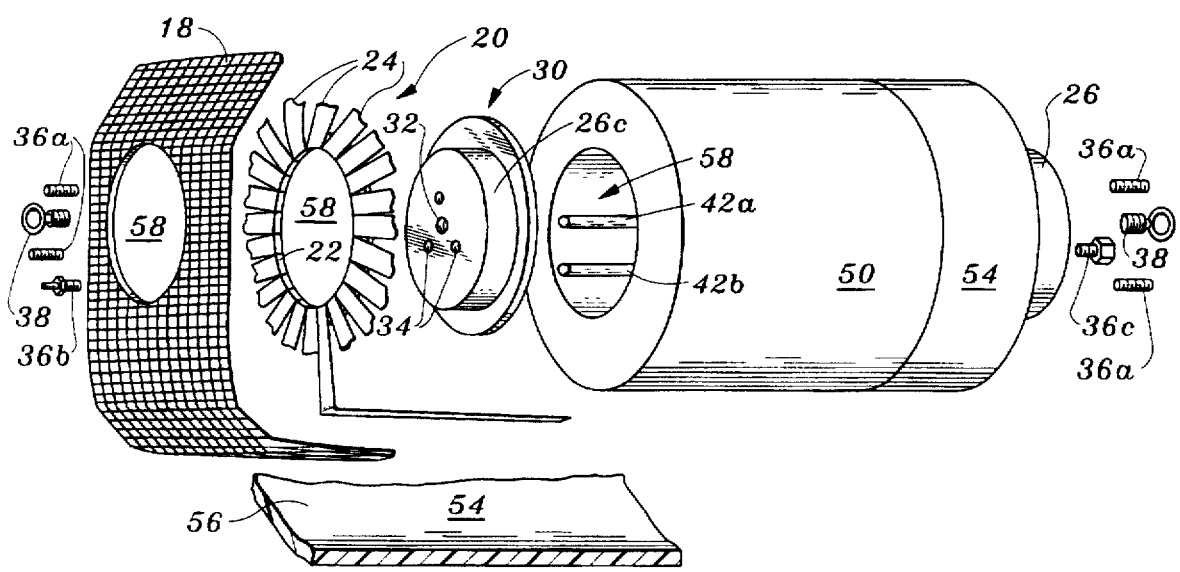
FIG. 2B shows further methodology with respect to FIGS. 1 and 2A.

As suggested earlier, and as shown for the left side in FIG. 2B, another piece of scrim 16 can be lapped over on the right side and on top of the spider 20. Prior to removing the plug 10 thus formed from the mandrel 40, the outer sheath 50 is laid upon the laminate thus formed. The outer sheath 50 includes peripheral edges 52 which turn down on edges of the plug 10 still providing clearance for the threaded bore 48 on the left-hand-side and edge 52 abuts against the periphery 26c of the core 26 on the right-hand-side.

A final build up, defined by a reinforcing band 54, may be placed on the right hand end of the plug 10 and include a downturn 56 also abutting against the periphery 26c of the core 26. Both the outer sheath 50 and the reinforcing band 54 are preferably formed from the same material as the elastomeric first ply 2.

When rubber is the elastomeric of choice in fabricating these plugs 10 the rubber is "raw", i.e., unvulcanized up to this point. Its tacky nature allows the plies 2, 6, 12, 50 to be laid on the mandrel 40 with edges placed in butting relationship and remain fixed until vulcanization. Upon the appropriate administration of heat during the vulcanized process and (optionally) pressure, the multiple plies 2, 6, 12, 50 of material are bonded together to form an integral mass. This is why the sequencing of laying is not so critical apart from needing an abrasion resistant outer surface.

In a preferred form of the invention, the thus formed plug is "blown" off of the mandrel 40. In essence, fluidic pressure, applied through the passageway 60, allows fluid passing from the threaded bore 48 to exit at an air outlet 62 strategically located at a cylindrical portion of the mandrel 40 adjacent the end of the plug 10 now having an end plate 30 disposed thereon. Air pressure causes expansion of the plug 10 and it is impelled over the mandrel 40 by stretching the opening around bore 48 provided on the left-hand-side. The build up stretches and slips over the cylinder 44 of the mandrel 40.

In practice, the scrim 16, annulus 22, and all the end treatments (e.g., the downturns of the plies 2, 6, 12, 50 on the left-hand-side of the mandrel 40 are provided with an opening 58, the clearance of which is substantially that of the outer periphery of the core 26 of the end plate 30.

There is no real size limitation on the diameter of the annulus 22, flange 28 or opening 58 (and/or therefore the diameter of the periphery 26C of the core 26). The smaller these diameters, the smaller the manhole through which the finished plug 10 can pass since it is only the incompressible metallic objects which provide insuperable impediments for the through passage of the plug 10. In some embodiments, it is contemplated that the end plates 30 shall not be used and the annulus 22 is formed from flexible material. In this eventuality, extremely large plugs 10 can be placed within small openings.

Note that the end plates 30 are each provided with a central hole 32 for cooperation with the pull ring 38, mentioned above. In addition, a plurality of peripheral holes 34 are placed through the end plate 30 that allow communication between two remote end plates 30 in the following manner. Note the presence of nipples 36 adapted to be threaded within the peripheral holes 34 on the end plate 30. For example, nipples 36a can cooperate with fluidic lines 42a and 42b to allow communication between disparate extremities of the plug 10. The fluidic lines 42a and b pass within the interior of the plug 10 and allow access between one end of the plug 10 to the other. Thus, a throughflow nipple 36a communicates with a fluid flow line 42a to allow fluid to be transferred from one end of the plug 10 and discharged at an opposite end such as when one pressure tests upstream conduits with either gas or liquid. Similarly, a valve nipple 36b can communicate with pressure readout line 42b that would denote the upstream pressure contained outside the plug 10 on an up-stream end opposite a pressure readout instrument (not shown). Notice also the provision of a nipple cap 36c on only the right side end plate 30. With the nipple cap 36C, the interior of the plug 10 can be pressurized by using a nipple valve 36b on the left side end plate 30.

The final fabrication details (shown in FIGS. 1 and 2B) can now be best appreciated. The lines 42a and b are operatively coupled to the right-hand-side plate 30 and extend out the left-hand-side of the plug. Prior to admission of the plate 30 into the plug's interior, the flange 28 has been coated with an elastomeric material. This end plate 30 is coupled to the lines 42 with nipples 36. The end plate 30 is then forced into the opening 58 on the left-hand-side of the plug 10 as shown in FIG. 2B. The end plate 30 is caused to register such that the outer periphery 26c of the core 26 abuts against the downturn on all of the plies 2, 6, 12, 50. Next, either scrim 16 or the spider 20 is placed over the outer periphery 26c of the core 26. Multiple plies of scrim 16 can be used. The straps 24 and the outer edges of the scrim 18 are then laid over on top of the cylindrical section of the plug 10. Finally, the reinforcing band 54 is lapped over this amalgam, with a downturn 56 placed against the outer periphery of the core 26. Finally, the plug 10 is subjected to one last vulcanization and defines a finished product.

With respect to FIGS. 3 through 7, and more particularly with respect to FIGS. 3 and 7A–7C the following differences between the first embodiment and the second embodiment can now be explored. At the outset, however, the second embodiment 100 is directed to a flowthrough stopper plug 100 which generally includes an outer expansible plug 100 similar to the plug 10 described infra but a central passageway 150 is provided through the central axis of the plug 100.

The passageway 150 is isolated from the interior of the plug 100 described hereinabove. In order to effect same, the end plates 30 of the first embodiment have been changed so that the passageway 150 can pass therethrough. Thus, an end plate 130 is shown in the FIGS. 3 and 7 as including a radially extending flange 128, with an interior rim of the exterior flange 128 providing a central bore which may be smaller than the opening 58 illustrated above.

The dimension of the opening 58 is preserved such that an outer face of the flange 128 (when passed through the interior of the plug 100 abuts against an inner wall surface of the ends of the plug 100. A peripheral wall 126c is in tangential-registry with the inner edge of the opening 58. The peripheral wall 126c also has an inner surface which communicates with an interior of the flange 128 shown in FIG. 3 as a shelf 126a. The shelf 126a provides support for studs 126b which face outwardly away from the interior of the plug 100. An area is provided within the circle of studs 126b and includes a groove 126d which is round like an O-ring but only semicircular in section. Its purpose will become apparent in the ensuing description.

Figure 7A:
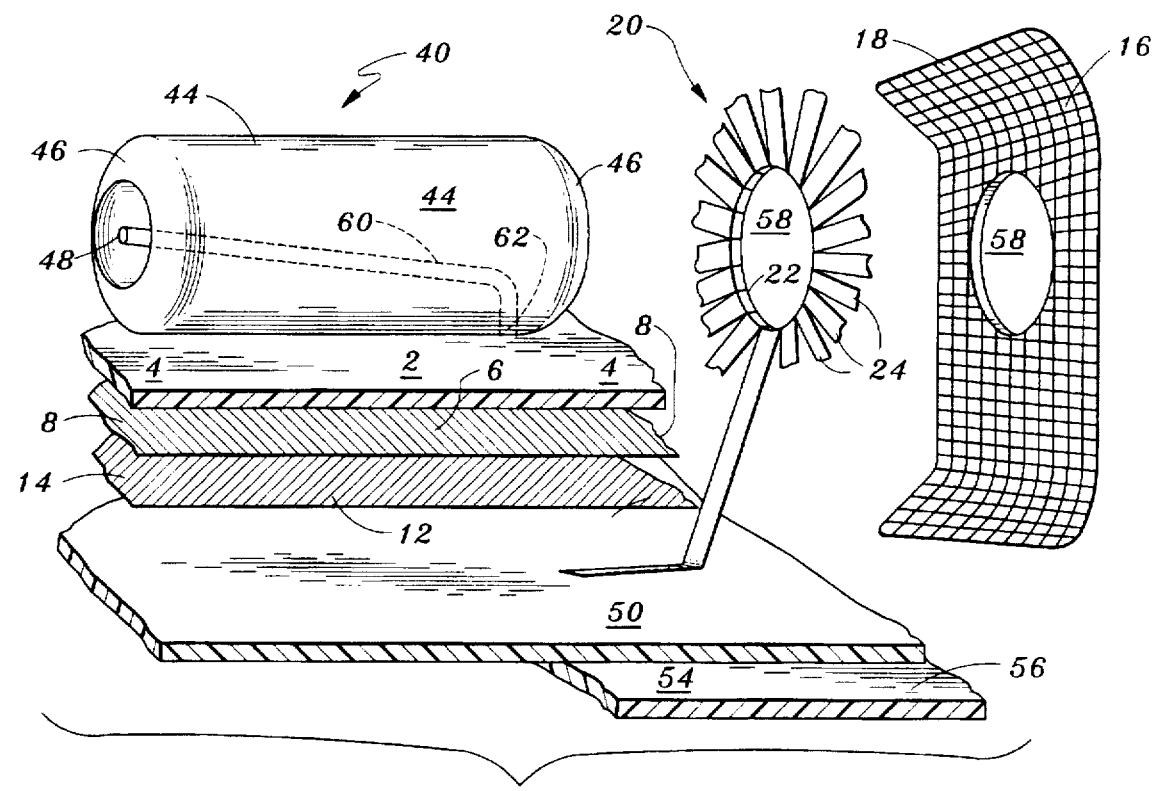
FIGS. 7A through 7C are perspective views of one lay-up methodology for FIGS. 3 through 6.

The methodology for the first embodiment is followed with substantial fidelity in this second embodiment with the exception that no end plate is adhered to the mandrel on the right hand side prior to any layup. Thus, as shown in FIG. 7A, the layup proceeds with the first ply of elastomeric 2, the two unidirectional plies 6 and 12, and is followed by the placement of the spider 20 against the right-hand-end of the mandrel as in FIG. 7A. The straps 24 are laid on top of the plug and the optional scrim 16 is placed thereover. Thereafter, a final outer sheet 50 of elastomeric is applied and an optional reinforcing band 54 can be applied thereover.

Figure 7B:
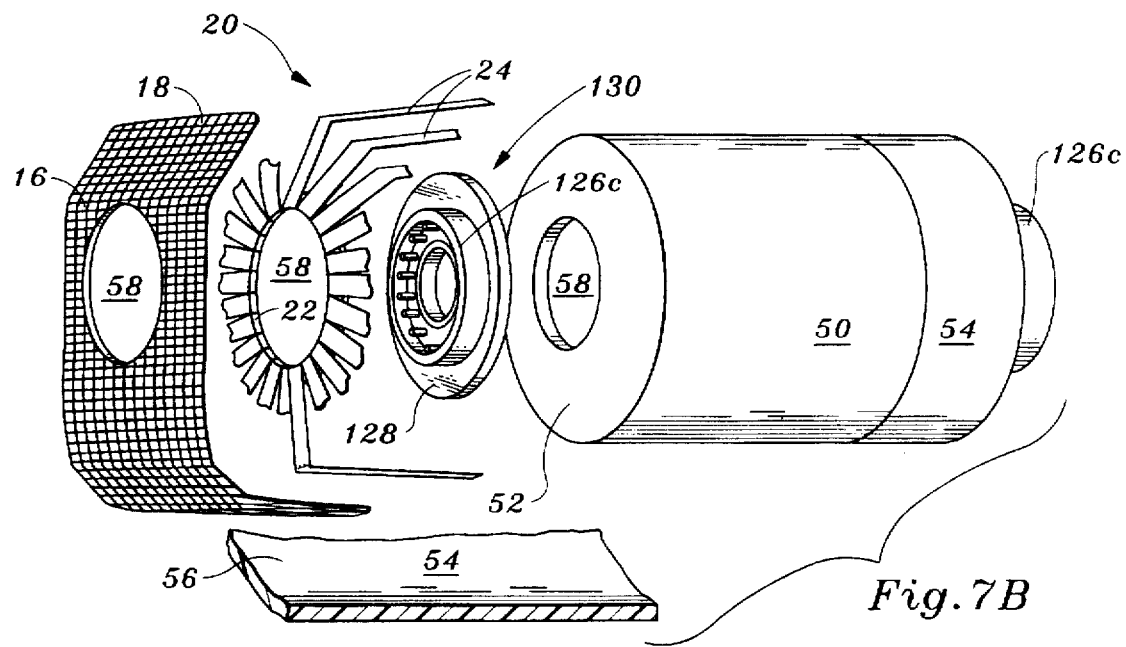

As mentioned in the earlier method, all of the ends are turned down on the ends of the mandrel 40, but in this version the right hand side of the mandrel 40 is preferably sealed over with the plies 2, 6, 12, 50. However, an opening 58 is maintained on the left-hand-side. Upon vulcanization of the layup thus described, the plug 100 shown in FIG. 7B can be blown off the mandrel 40. A first end plate 130 can be inserted on the right-hand-side of the plug 100 through the plug's interior. However, since the right-hand-end of the plug 100 had been covered with the various layers of plies 2, 6, 12, 50 a hole must first be cut out of the plug 100 corresponding to the inner diameter of the annulus 22 of the spider 20. Then, the first end plate 130 can be placed at that end by insertion through the left-hand-side of the plug 100 such that the peripheral wall 126c of end plate 130 extends outwardly from the plug 100 in abutting relationship as shown in FIG. 7B. It should be noted that, prior to insertion within the interior of the plug 100 the flange 128 is first coated with an elastomeric to hold it in place against the inner end of the plug 100.

An alternative procedure would have been to form the end plate 130 integral with the plug 100 as had been described with respect to the first embodiment. Before blowing the plug 100 off the mandrel 40 one would first occlude the central opening in the end plate 130 by means of a sealing plate which would have been fastened to the studs 126b. Using this methodology, the occluding plate would thereafter be removed for the following steps.

Figure 5:
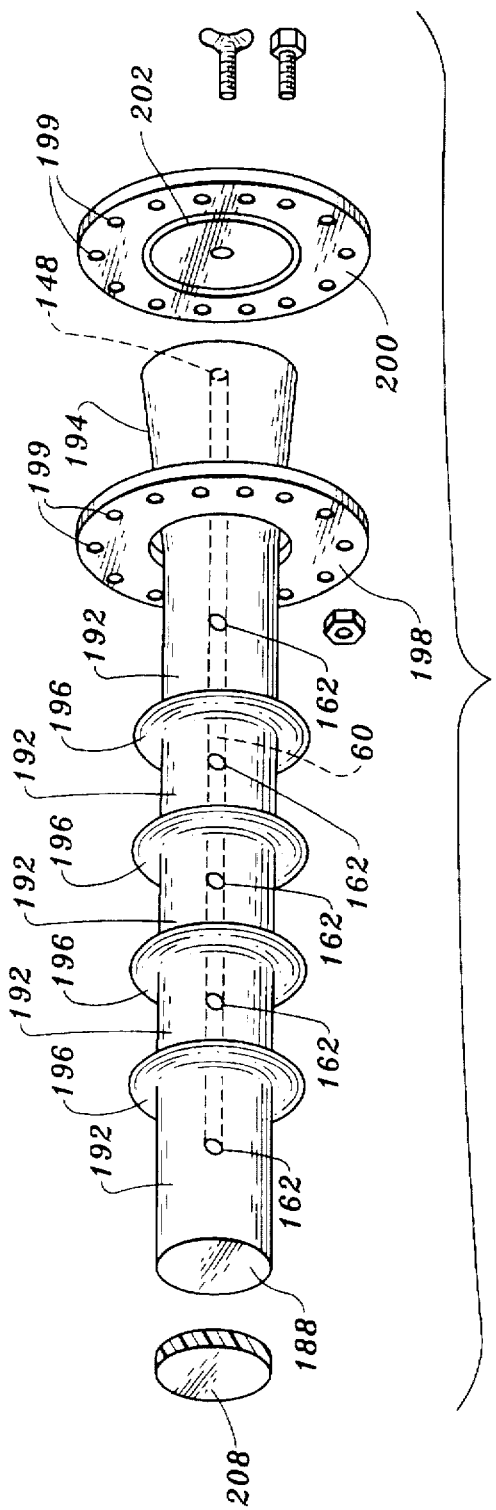
FIG. 5 is a perspective view of the mandrel complementing the FIG. 4 lay-up.
Figure 4:
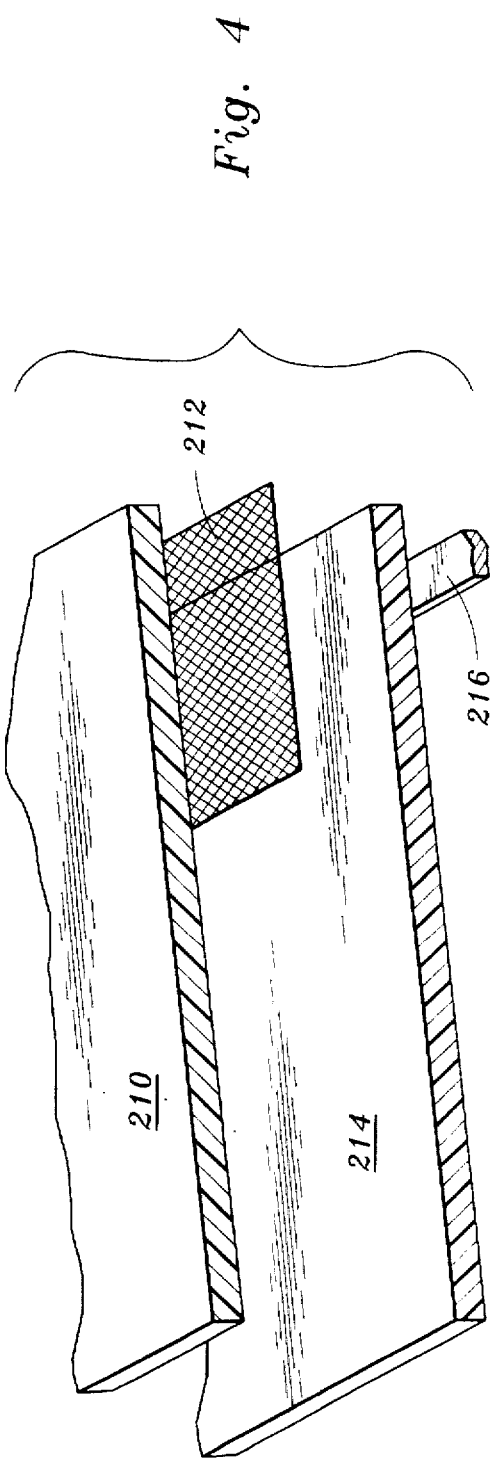
FIG. 4 is a fragmentary perspective view of one component for lay-up methodology in FIG. 3.

FIG. 7B shows the remaining sequence for assemblage to finish off the left-hand-side of the plug 100. An end plate 130 is forced within the opening 58 such that the flange 128 (after having been coated with an elastomeric) abuts against the end wall interior of the plug 100. Thus, the peripheral wall 126c still projects out from the plug 100 and provides a purchase area to receive the spider 20. Note that the annulus 22 of the spider 20 has an inner diameter complemental to the outer dimension of the peripheral wall 126c. Next, the straps 24 are placed on top of the plug lapping thereover a few inches. Next, the scrim 16 can be applied by lapping the scrim 16 over the left hand end such that the opening 58 on the scrim 16 is in tangential registry with the peripheral wall 126c of the end plate 130. As mentioned above, more layers of scrim 16 could be provided and the scrim 16 could have also been placed to the right of the spider 20. Once the free ends 18 of the scrim 16 have been placed down on the outer periphery of the plug 100 a reinforcing band 54 can be placed on the left-hand-end including a down turn 56 which is intended to lap against the peripheral wall 126c. A final vulcanization of the plug 100 shown in FIG. 7B allows the plug 100 to now be utilized with the passageway 150 shown in FIGS. 7C and fabricated as shown in FIGS. 4 through 6.

In essence, the passageway 150 is formed from three sections: a left hand section 160, a right hand section 170 and a central section 180. Since there is symmetry between the left and right-hand sections, both will be discussed at the same time. The central section 180 is a linear conduit that may be butt connected to the left and right hand sections 160, 170. The central section 180 can vary in length depending upon the overall length of the plug 100.

By way of background, flowthrough stopper plugs 100 are commonly used when it is necessary to seal off a conduit yet treat an area bridging between two plugs that are interposed in the conduit. Such plugs also can bypass a conduit section allowing access between spaced plugs. A chemical solution is frequently needed to remove roots or other types of blockages within the conduit. A chemical admitted through the passageway 150, once its work has been done, can be evacuated from the system for subsequent recycling. Typically, a hose (not shown) is placed within the interior of the passageway 150 and the chemical is administered through the hose.

The inflation characteristics of the plug 100 are such that, once the plug 100 has expanded and therefore sealed off the conduit, the passageway 150 is formed from material which contracts to also provide a good seal against the hose placed therewithin. However, when the plug 100 is deflated, the hose can be readily removed by the pressure relief afforded the passageway 150 returning to its original unconstricted configuration.

In essence, the left and right sections 160, 170 are laminated using the mandrel of FIG. 5 with the plies shown in FIG. 4. The end treatment is defined in FIGS. 6A–E. In general, a mandrel 190 is provided with an elongate cylindrical section 192 interrupted by means of toroids 196 spaced thereon. The toroids 196 are integrally attached to the cylindrical section 192 of the mandrel 190.

One end of the mandrel 190 has an outwardly flared taper 194 adjacent an air inlet 148. An interior passageway 60 is provided that allows air to pass from the air inlet 148 through the interior of the mandrel 190 and out a multiplicity of outlets 162 located between toroids 196.

The mandrel 190 is completed by an end wall 188 on the left end and annular ring 198 which is adapted to slide over the end of the mandrel having the tapered end 194. The annular ring 198 has a plurality of holes 199 oriented to lie in registry with similar holes 199 on an end plate 200. Note the presence of an O-ring recess 202 on the end plate 200. A similar O-ring recess 202 is provided on the ring 198. See FIG. 6A.

Initially, a disc-shaped plug 208 of rubber material is placed on the circular end wall 188 of the mandrel 190 remote from the flared end 194. Next, and prior to the ring 198 being placed on the mandrel 190 a first ply 210 of elastomeric material is wrapped on the mandrel 190. Next, reinforcing material 212 such as scrim or two plies of unidirectional fiber are laid up on the right-hand-end of the mandrel 190 overlying the flared end 194. Finally, a last layer of elastomeric 214 is laid upon the mandrel 190. Optionally, a reinforcing band 216 may be placed on the mandrel 190 overlying the flared end 194.

With respect to FIGS. 6A–E, the flare 194 and its purpose will now become evident. The ring 198 is slid over the flared end 194. Please see FIG. 6A. Alternatively, a split ring could be used. Next, the elastomeric laminate adjacent the end 194 is turned up as shown in FIGS. 6B and 6C, along the direction of the arrow A. Finally, the end plate 200 is placed on an end of the mandrel 190 and secured thereto. Note that the ring 198 had the same annular groove 202 as has the end plate 200. The ring plate 198 and the end plate 200 are fastened together by means of bolts 203. The bolts cooperate with nuts 205 to fasten the end of the rubber buildup radially outwardly on the flared end 194.

Finally, vulcanization of the rubber on the mandrel 190 will impart to the layup rubber an outwardly flared flange 220. Also, the process causes the O-rings 222 to be imparted into the flange 220 as shown in FIG. 6F. After vulcanization, both the ring 198 and the end plate 200 are removed. Air through a source S shown in FIG. 6E will blow the section 160 or 170 off the mandrel. Thereafter, the disc 208 is cut off so that the hollow interior is allowed communication from both ends.

Figure 3:
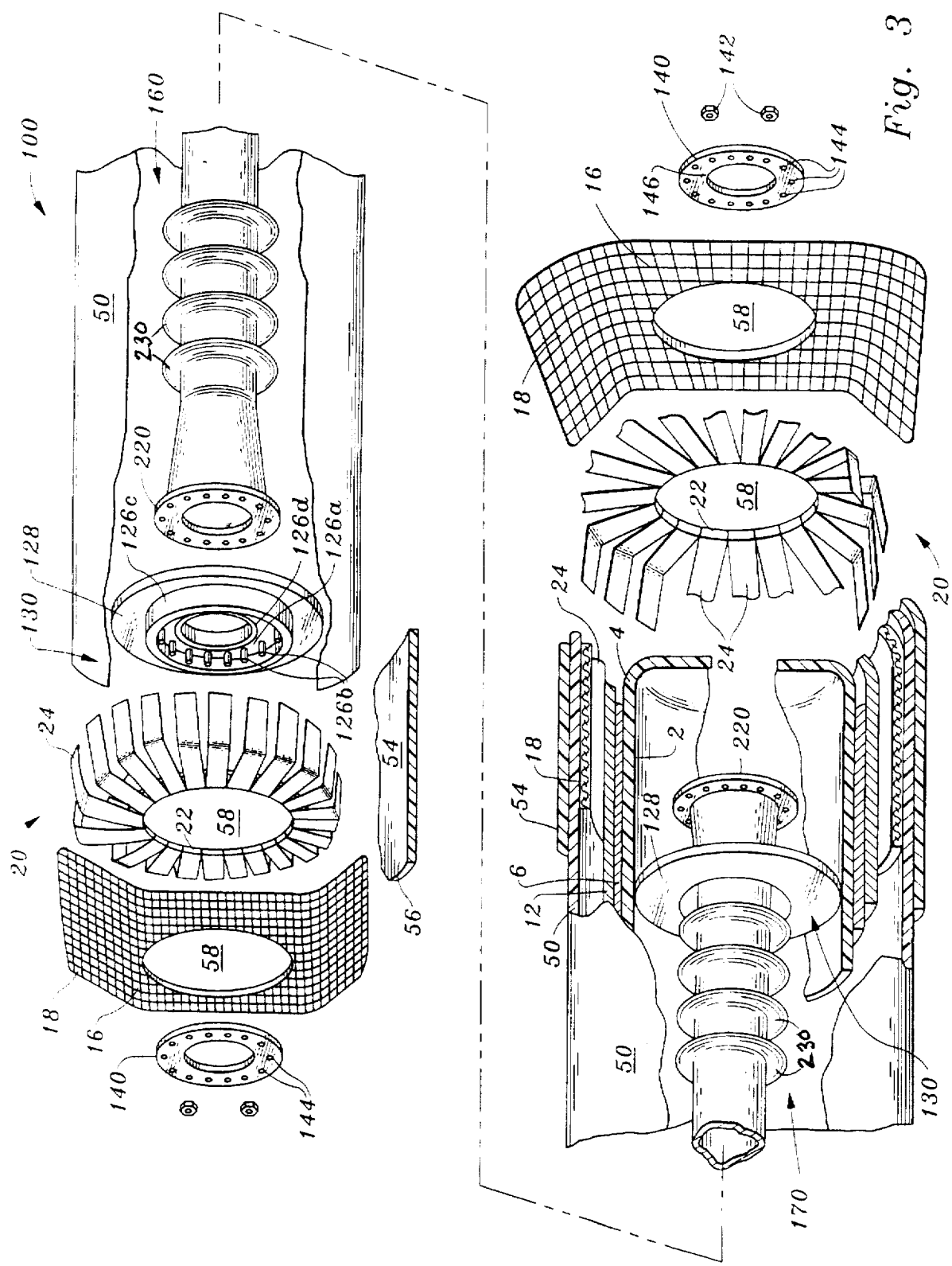
FIG. 3 is an exploded parts perspective view, partially in section of a second form of the invention.
Figure 7C:
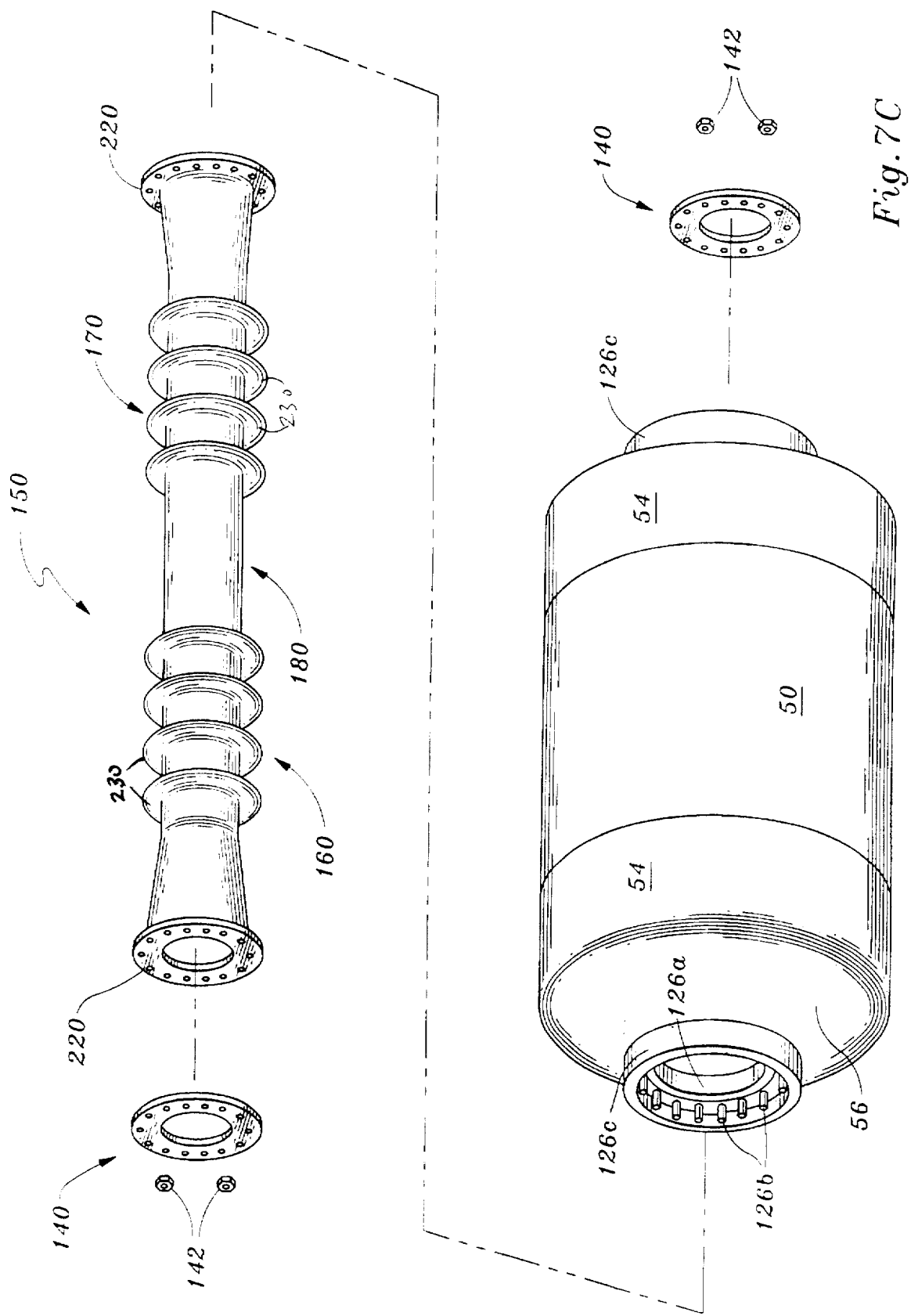

The two sections 160, 170 have an interposed central section 180 of uniform circular cross-section to provide the structure shown in FIG. 7C and in FIG. 3. An advantage in this plug 100 is that it allows itself to be folded along the transverse centerline of the plug 100 with a minimal amount of effort. Moreover, the toroids 230 formed on the passageway sections 160, 170 allow longitudinal and latitudinal play (flex) in the passageway 150.

The final assembly details of the passageway 150 into the plug body are shown in FIG. 7C. The peripheral flange 220 of the passageway 150 is distorted to fit within the opening of both end plates 130 so that it butts out on the right-hand-side of the plug. It is fixed thereto by means of a sealing ring 140 which has the complemental O-ring groove 146 as does the end plate 130 as shown at reference numeral 126d so that a good seal is provided with O-ring 222 formed on the flange 220. Nuts 142 hold the sealing ring 140 against the flange 220 and the shelf 126a via the studs 126b which pass through holes 144 on ring 140. A similar process allows the flange 220 on the left-hand-side of FIG. 7C to be fixed to the left-hand-end of the plug 100 by means of another sealing ring 140.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A plug for obturating a conduit having an interior bore, comprising, in combination:
    a sleeve having an exterior dimension smaller than the bore of the conduit, said sleeve to be received within the bore, said sleeve having first and second ends,
    a first end wall closing said first end,
    a second end wall closing said second end,
    plug reinforcing means integrally formed on one said end, said plug reinforcing means including means to bind said sleeve to said one said end wall, said binding means emanating from said one said end wall and extending into said sleeve, said binding means integrally formed in both said one end wall and said sleeve whereby said plug reinforcing means enhances the integrity of said plug;
    wherein said plug reinforcing means includes a ring having an opening passing centrally therethrough;
    wherein said binding means includes a plurality of straps each having a first tip separated from a second tip by an intermediate portion, each said strap fixedly attached to said ring with at least one of said tips integrated with said sleeve; and
    wherein said plug reinforcing means includes said ring fixedly attached to one said end, said ring formed of rigid material.

2. A plug for obturating a conduit having an interior bore, comprising, in combination:
    a sleeve having an exterior dimension smaller than the bore of the conduit, said sleeve to be received within the bore, said sleeve having first and second ends,
    a first end wall closing said first end,
    a second end wall closing said second end,
    plug reinforcing means integrally formed on one said end, said plug reinforcing means including means to bind said sleeve to one said end wall emanating therefrom extending into said sleeve, said binding means integrally formed in both said one end wall and said sleeve whereby said plug reinforcing means enhances the integrity of said plug;
    wherein said plug reinforcing means includes an annulus imbedded in said one said end;
    wherein said annulus attaches to said binding means along a periphery thereof; and
    wherein said annulus receives an end plate in a central portion thereof, said end plate having a peripheral wall which abuts against an interior of said annulus.

3. The plug of claim 2 wherein said end plate includes a radially extending flange which is placed inboard of said annulus and abuts against said annulus.

4. The plug of claim 3 wherein said plug reinforcing means are provided at both said ends on said end walls of said plug.

5. The plug of claim 4 wherein said plug is formed from a plurality of plies and said plies include downturned end portions which abut against said peripheral wall of said end plate.

6. The plug of claim 5 wherein said plies include at least two layers of unidirectional ply material in which the direction of said unidirectional material is skewed from a long axis of the plug such that one unidirectional ply is offset from the long axis by a substantially equal and opposite angle as another unidirectional ply.

7. The plug of claim 6 wherein one ply includes elastomeric material.

8. The plug of claim 7 wherein two said end plates are provided one at said first end and one at said second end and each includes a central core formed as a plate through which a plurality of holes are provided.

9. The plug of claim 8 wherein said plural holes include accommodation for a pull ring, and throughflow nipples.

10. The plug of claim 9 wherein two said through flow nipples on each said plate between said first end and said second end are connected by means of two lines, one line provides fluid flow through the plug and another line provides a pressure readout.

11. The plug of claim 10 wherein another nipple is provided on one said end plate and includes means for admitting air into the plug.

12. The plug of claim 11 wherein said end plate includes a central opening and a shelf extends inwardly into said central opening, a plurality of studs are directed outwardly from said plug, supported on said shelf.

13. The plug of claim 12 including a central passageway extending through said end plates and isolated from said plug, said passageway having two ends, one end anchored to said shelf on said end plate.

14. The plug of claim 13 wherein said passageway includes two distal sections interconnected by a central section, said distal sections including flexible toroids disposed thereon allowing flex.

15. The plug of claim 14 wherein said both ends of said passageway are provided with radially extending flanges for attachment one to each said shelf of each said end plate.

16. The plug of claim 15 wherein said passageway conically tapers at an outermost extremity inwardly to said toroids.

17. The plug of claim 16 wherein said inner and outer surfaces of said passageway flange include annular sealing rings disposed thereon, an annular groove is provided on said shelf inboard said studs, and a sealing ring is placed on an outboard extremity of said passageway flange, said sealing ring provided with an annular groove to receive said passageway flange thereagainst.

18. A plug for obturating a conduit having an interior bore, comprising, in combination:

a sleeve having an exterior dimension smaller than the bore of the conduit, said sleeve to be received within the bore, said sleeve having first and second ends, a first end wall closing said first end, a second end wall closing said second end, plug reinforcing means integrally formed on one said end, said plug reinforcing means including means to bind said sleeve to one said end wall emanating therefrom extending into said sleeve, said binding means integrally formed in both said one end wall and said sleeve whereby said plug reinforcing means enhances the integrity of said plug;

wherein said plug reinforcing means includes an annulus imbedded in said one said end, and wherein said annulus receives an end plate in a central portion thereof, said end plate having a peripheral wall which abuts against an interior of said annulus.

19. The plug of claim 18 wherein said plug is formed from a plurality of plies and said plies include downturned end portions which abut against said peripheral wall of said end plate; and wherein said plies include at least two layers of unidirectional ply material in which the direction of unidirectional material is skewed from a long axis of the plug such that one unidirectional ply is offset from the long axis by a substantially equal and opposite angle as another unidirectional ply.

20. A plug for obturating a conduit having an interior bore, comprising, in combination:

a sleeve having an exterior dimension smaller than the bore of the conduit, said sleeve to be received within the bore, said sleeve having first and second ends, a first end wall closing said first end, a second end wall closing said second end, plug reinforcing means integrally formed on one said end, said plug reinforcing means including means to bind said sleeve to one said end wall emanating therefrom extending into said sleeve, said binding means integrally formed in both said one end wall and said sleeve whereby said plug reinforcing means enhances the integrity of said plug;

wherein said plug reinforcing means includes an annulus imbedded in said one said end;

wherein said annulus attaches to said binding means along a periphery thereof;

wherein said annulus receives an end plate in a central portion thereof, said end plate having a peripheral wall which abuts against an interior of said annulus;

wherein said plug is formed from a plurality of plies and said plies include downturned end portions which abut against said peripheral wall of said end plate; and wherein said plies include at least two layers of unidirectional ply material in which the direction of unidirectional material is skewed from a long axis of the plug such that one unidirectional ply is offset from the long axis by a substantially equal and opposite angle as another unidirectional ply.

21. The plug of claim 20 wherein said ring is formed from rigid material.

22. A plug for obturating a conduit having an interior bore, comprising in combination:

a sleeve having an exterior dimension smaller than the bore of the conduit, said sleeve to be received within the bore, said sleeve having first and second ends, a first end wall oriented transverse to a long axis of said sleeve closing said first end, a second end wall oriented transverse to a long axis of said sleeve closing said second end, plug reinforcing means on said first end wall including a ring having an opening therein, said ring having a geometric center aligned with said long axis of said sleeve, straps fixedly attached to said ring and radiating therefrom and into fixed attachment to said sleeve, and an end plate adjacent said ring on a side of said ring nearest to said second end, said end plate including means to support said ring and said end plate also including means to align said ring with said long axis of said sleeve.

23. The plug of claim 22 wherein said plug is formed from a plurality of plies and said plies include downturned end portions which abut against said peripheral wall of said end plate; and wherein said plies include at least two layers of unidirectional ply material in which the direction of unidirectional material is skewed from a long axis of the plug such that one unidirectional ply is offset from the long axis by a substantially equal and opposite angle as another unidirectional ply.

24. The plug of claim 22 wherein said support means of said end plate is a flange extending radially from said end plate having a diameter greater than an inner diameter of said ring.

25. The plug of claim 22 wherein said alignment means of said end plate is a peripheral wall substantially parallel to said long axis having an outer width similar to an inner diameter of said ring.

26. A plug for obturating a conduit having an interior bore, comprising in combination:

a sleeve having an exterior dimension smaller than the bore of the conduit, said sleeve to be received within the bore, said sleeve having first and second ends, a first end wall oriented transverse to a long axis of said sleeve closing said first end, a second end wall oriented transverse to a long axis of said sleeve closing said second end, and plug reinforcing means on one said end including a plurality of straps extending across a juncture between said sleeve and said one said end wall, said straps constructed of a plurality of fibers extending parallel to a long axis of said straps, said fibers resisting elongation longitudinally, said straps formed in an elastomeric which captures said fibers in said strap in a manner which allows strap distention in a direction orthogonal to said long axis to accommodate plug inflation;

whereby said straps are expandable laterally during inflation and radial expansion of said sleeve of said plug but remain substantially unelongated longitudinally, resisting longitudinal elongation of said plug and encouraging contraction of said plug along a long axis of said sleeve.

27. The plug of claim 26 wherein said plug reinforcing means is included on both said first end and said second end.

28. The plug of claim 26 wherein said plug is formed from a plurality of plies and said plies include downturned end portions which abut against said one said end; and wherein said plies include at least two layers of unidirectional ply material in which the direction of unidirectional material is skewed from a long axis of the plug such that one unidirectional ply is offset from the long axis by a substantially equal and opposite angle as another unidirectional ply.

\* \* \* \* \*